Patented June 2, 1931

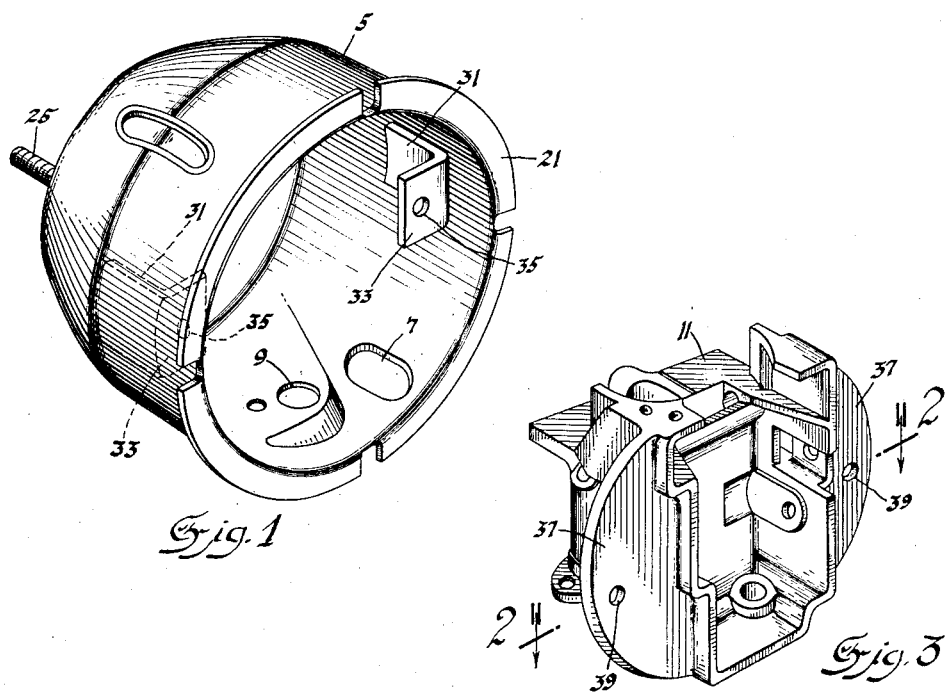
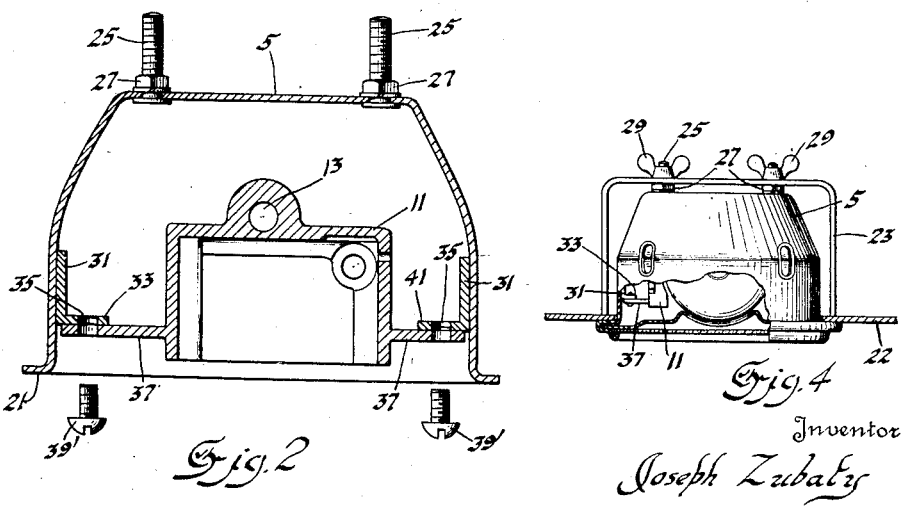

1,808,198

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

INSTRUMENT MECHANISM HOLDER

Application filed November 28, 1927. Serial No. 236,314.

This invention relates to measuring instruments. It is concerned more particularly with means for mounting such instruments—for example, speedometers—on the instrument board of an automobile. It is useful also wherever an instrument having delicate parts is to be carried by a support subject to jars and jolts and irregular movements.

An object of the invention is to support such an instrument in such a way that the delicate mechanism of the instrument may not be injured or interfered with in its operatio by the shocks and jars to which its support is subject. A further object to is provide a resilient support between an instrument carrying frame and its casing, which latter is to be rigidly clamped to its support. Other objects and advantages will be apparent from the following description.

In the drawings which accompany this description,

Figure 1 is a view in perspective of a casing.

Figure 2 is a section through the frame and casing in assembled relation, the section through the frame being on line 2—2 of Figure 3.

Figure 3 is a perspective of an instrument frame.

Figure 4 is a plan view partly broken away to show the attaching means.

Referring by reference characters to the drawings, numeral 5 represents a casing or housing which is to be attached to the instrument board of a motor vehicle. It will be understood that such a casing may be used on the instrument board of a motorboat or aeroplane or anywhere that such an instrument may be used. While not an essential part of this invention it may be mentioned that the opening 7 shown in the casing is for the passage of a reset stem, and that opening 9 is for the passage of the shaft which couples the usual flexible driving shaft to the internal shaft suitably mounted in a frame 11 and which shaft is to drive the odometer mechanism and operate the rotating part of the magnetic speedometer.

In Figure 2 the opening 13 is for the passage of this driving shaft. As is customary the casing 5 is provided with a flange 21. The rear face of this flange may, in one preferred form of mounting, engage the forward face of the instrument board or panel 22. For the attachment of the housing 5 to the instrument board or panel 22 there is employed a substantially U-shaped clamp 23 which engages the rear face of the instrument board and is provided with apertures receiving threaded studs 25 secured by nuts 27 to the rear of the housing 5. By the provision of nuts 29 the instrument casing may be drawn rearwardly and held firmly by engagement of the flanges 21 with the supporting board 22 in a manner which will be obvious from an examination of Figure 4.

With a construction as above described wherein the casing is rigidly clamped to the instrument board, as it must ordinarily be, all the shocks and jars to which the instrument board is subjected are transmitted to the casing. If now, as is customary, the instrument frame is rigidly secured to the casing it too becomes subject to the shocks and jars. It is the purpose of this invention to provide resilient means between the frame and the casing to the end that the shocks and jars to which the casing is subjected may not be transmitted to the frame which carries the delicate parts of the speedometer and odometer.

To carry out the purpose above indicated angular members 31 are secured, preferably by welding, to the inner wall of the casing 5 with extensions 33 directed radially inward. These radially inward extensions 33 are resilient in character and provided with openings 35. In Figure 1 two diametrically opposite members 33 are shown. It will be understood, of course, that more may be used if desired.

In Figure 3 is shown an instrument frame. This instrument frame is preferably formed by die casting, its various irregular portions being designed to accommodate the several parts of the odometer and speedometer. Inasmuch as these several portions form no part of the present invention a description of these features will not be included. It should, however, be noted that the die casting is formed with outwardly directed portions 37 which portions are provided with apertures 39, as shown in Figures 2 and 3. When the die cast instrument carrying frame is inserted in its housing the openings 39 register with openings 35 of the yielding members 33. The frame is then secured in position in the casing by means of screws 39' and nuts 41.

It will be seen that by this construction the shocks and jars to which the casing 5 are subject owing to its being rigidly clamped to the supporting member 22 are absorbed by the resilient member 33, in large measure at least, and not transmitted to the frame 11. By this means the delicate parts carried by the instrument frame are not damaged nor is their operation interfered with. The result is accomplished by a construction which is extremely simple and economical to manufacture.

It may be added that in the event that a bezel is used surrounding the flange 21 it will be a portion of the bezel which directly engages support 22 when the casing is clamped to the support. This is as shown in Fig. 4. The effect is the same. The casing, whether its flange engages the support directly or through an intervening bezel part, is rigidly carried by the support and the instrument frame is rendered free from the jars transmitted to the casing.

I claim:

In an instrument mounting, an instrument carrying frame, a casing, means including plates secured to and within said casing and having inwardly directed resilient arms, said frame having cooperating projections, and means securing said projection to said resilient arms.

In testimony whereof I affix my signature.

JOSEPH ZUBATY.